United States Patent Office 3,359,205
Patented Dec. 19, 1967

3,359,205
DETERGENT COMPOSITION CONTAINING SUBSTITUTED BENZYL ETHER NON-IONIC DETERGENTS
Richard J. Day, St. Louis, Mo., assignor to Monsanto Company, St. Louis, Mo., a corporation of Delaware
No Drawing. Filed July 8, 1965, Ser. No. 470,351
9 Claims. (Cl. 252—89)

ABSTRACT OF THE DISCLOSURE

The present invention relates to novel compositions containing (a) novel compounds having the general formula

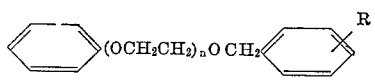

where R is an organic radical such as $C_{12}H_{25}$, $n$ is a number of about 21 through 30, and (b) a water-soluble detergent builder salt such as sodium tripolyphosphate, sodium sulfate, sodium metasilicate and the like. One of the most distinguishing characteristics of the novel compositions of the present invention is the low foaming and high detergency which is characteristic of said composition.

---

The present application is a continuation-in-part of my co-pending U.S. patent applications, Ser. No. 242,355, filed Dec. 5, 1962, and Ser. No. 262,856, filed Mar. 5, 1963, said last two mentioned U.S. patent applications are now abandoned. Application Ser. No. 262,856 is a continuation-in-part of application Ser. No. 242,355. The disclosure and claims of the present application should be considered in conjunction with the disclosure and claims of the aforementioned patent applications and should be considered as a continuation-in-part thereof.

The present invention relates to novel chemical compounds and to novel methods of preparing such compounds, and to novel compositions containing such compounds. The present invention further relates to a novel class of substituted benzyl ethers which are low foaming, nonionic surface active compounds which are useful and efficient, when incorporated with other materials, in washing operations, particularly in laundering and dishwashing operations.

In U.S. Patent 2,856,434, there are disclosed certain low foaming, nonionic surface active compounds such as benzyl ethers of octylphenoxypolyethoxy ethanol which have been disclosed for use in commercial mechanical dishwashers, residential dishwashers, automatic laundering machines and in other operations where the presence of foam or suds is considered undesirable. However, these low foaming, nonionic detergent compounds which are in general commercial use possess certain disadvantages in that the detergency properties of such compounds, when dissolved in water, generally decrease as the foaming properties decrease. Stated differently, such nonionic detergent compounds which produce little or no foam or suds when dissolved in water generally have significantly less detergency than nonionic detergent compounds which produce significantly large amounts of foam or suds when dissolved or dispersed in water.

The present invention provides novel low foaming nonionic surface active compounds and compositions containing the same having unexpectedly high detergent activity and which overcome the above-mentioned disadvantages of the prior nonionic surface active compounds referred to above. The present invention also provides processes for preparing these compounds.

It is one object of the present invention to provide a novel class of detergent compounds.

It is a further object of this invention to provide novel detergent compositions incorporating the novel compounds.

It is another object of this invention to provide processes for preparing such novel compounds.

It is a further object of this invention to provide a class of substituted benzyl ethers of phenoxypolyethoxy ethanol which are low foaming when dissolved in water, but which unexpectedly have higher detergency than the previously known, low foaming detergents referred to above.

Still further objects of the present invention are disclosed in or will become apparent from the following description and appended claims.

Compound description

The present invention, in part, provides a class of novel nonionic detergent compounds having the general formula:

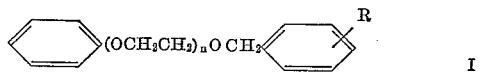

I where R is an organic radical in the ortho, meta or para position and is characterized in being incapable of undergoing a reaction with an alcohol and $n$ is a number of from between about 10 and about 30. The above compounds are generally liquid or solid, stable, water-soluble compounds having hereinafter defined foaming and detergency characteristics.

In Formula I referred to above, the organic radical R may be any of a wide variety of substituted or unsubstituted aliphatic or aromatic groups or radicals, which are incapable of undergoing a reaction with an alcohol. Thus, in Formula I, R may be a substituted or unsubstituted aromatic or aliphatic group or radical and may be in the ortho, meta or para position on the benzyl ring. Unsubstituted aromatic groups or radicals include phenyl, benzyl, alpha and beta naphthyl, pyridyl, quinolyl and anthryl, etc., groups or radicals. The substituents of the substituted aromatic groups or radicals are substituents which are incapable of undergoing a reaction with an alcohol and include, for example, halo, nitro and alkyl substituted, etc., groups or radicals. The alkyl substituted groups or radicals preferably contain from about 1 to about 20 carbon atoms in the alkyl group.

The unsubstituted aliphatic radicals usually contain from about 1 to 40 carbon atoms, preferably from about 8 to about 20 carbon atoms, in the aliphatic group. Although such aliphatic radicals may contain more than 40 carbon atoms, compounds containing such radicals may have limited water solubility. Thus the unsubstituted aliphatic hydrocarbon groups or radicals in the above structure include, for example, alkyl groups or radicals having a straight or branched chain, e.g. methyl, ethyl, n-propyl, isopropyl, n-butyl, isobutyl, secbutyl, t-butyl, n-amyl, isoamyl, n-hexyl, isohexyl, n-heptyl, isoheptyl, n-octyl, isooctyl, 2-ethyl hexyl, nonyl, decyl, undecyl, dodecyl, tridecyl, dodecyl propyl, pentadecyl, tri-amyl, etc., groups or radicals. The substituents of the substituted aliphatic groups or radicals may be, for example, nitro, carb-alkoxy, methoxy, carbethoxy, ethyl, phenyl, benzyl, alpha and beta naphthyl, etc., groups or radicals.

The number of ethoxy units or groups, denoted as $n$ in the above Formula I, may be varied as desired from between about 10 to about 30. Generally speaking, the larger number of ethoxy groups in a particular compound will tend to increase the solubility of the compound but will also tend to increase the foaming properties of the compound. Thus when the compound contains more than 30 ethoxy units it will usually produce significant quantities of foam when dissolved or dispersed in water. When the compound contains 12 or more ethoxy groups a unit or two of propylene oxide may be substituted for a similar amount of ethylene oxide without substantially altering the foaming and detergency characteristics of the compound. Thus in the above compounds containing more than 12 ethoxy groups propylene oxide and ethylene oxide are equivalent to this extent. When more propylene oxide groups are present, the solubility and detergency characteristics of the compound will usually be materially and undesirably lowered.

Particularly advantageous compounds of the present invention and falling within the scope of the above formula are detergent compounds characterized in having the general formula:

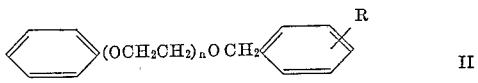

where R is an aliphatic radical having the significance hereinbefore described, and $n$ is a number between about 15 and about 25. Compounds of this class are generally stable, water-soluble, liquid or solid detergent compounds and are characterized in being low foaming and in having high detergency when dissolved in water. Compounds of this class are particularly useful in compositions or formulations employed in operations where foam is undesirable and high detergency is necessary, or required, such as, for example, in dishwashing and laundering operations.

In Formula II, above, R may be any of the hereinbefore described aliphatic radicals. When the number of ethoxy units $n$ are below 10 in the above formula II, the compounds generally have limited water solubility and therefore limited utility. On the other hand, when the ethoxy units are above 30, the compounds will tend to foam unless the aliphatic group or radical R is a long chain and contains more than 30 carbon atoms.

A preferred class of compounds falling within the scope of Formulae I and II are detergent compounds characterized in having the general formula:

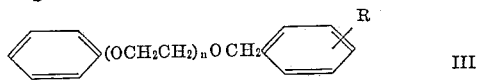

where R is an alkyl group having the significance hereinbefore described and having about 8 to about 20 carbon atoms and $n$ is a number of from between about 15 to about 25.

A particularly preferred class of compounds falling within the scope of all of the above formulae are dodecyl benzyl ethers of phenoxypolyethoxy ethanol and have the general formula:

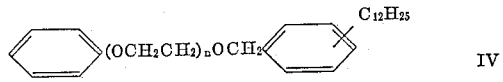

where $n$ is a number of from between about 15 and about 25. The compounds of this class are stable, water-soluble liquid or solid detergent compounds with low foaming characteristics and have significantly better detergency than the previously known benzyl ethers of octylphenoxypolyethoxy alcohol.

*Process description*

The novel compounds of this invention falling within the above Formula I may be suitably prepared by a process which comprises reacting a substituted benzylhalide with a phenoxypolyethoxy alcohol having the general formula:

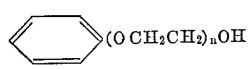

in the presence of an alkaline condensation agent until a substituted benzyl ether of a phenoxypolyethoxy alcohol is formed and thereafter separating the ether so formed.

The substituted benzyl halide employed in the above process has the general formula:

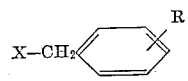

in which R is an organic radical having the same significance as the organic radical previously described for Formula I and X is a halogen, preferably chlorine or bromine.

In the formation of the phenoxypolyethoxy alcohols in the range of from about 10 to about 30 ethoxy units, there is sometimes obtained a mixture of compounds having different numbers of ethoxy units. This is known and is no deterrent to the present reaction since satisfactory and useful compounds are formed from the mixture of compounds in the same way as the individual compounds. These alcohols, in single or mixed forms, are liquid or solid at room temperature (e.g. 25° C.) depending upon the number of ethylene oxide groups present. The exact nature of the mixtures can be readily determined by well-known analytical techniques.

In the reaction of the processes of this invention the amount of the phenoxypolyethoxy alcohol employed is not critical, but will depend upon the amount of product desired and the size of reaction facilities available. However, the amount of substituted benzyl halide employed will depend upon the amount of the alcohol used. It has been found especially desirable to react from about a 1.0 to about a 1.3 molecular proportion of the substituted benzyl halide with about 1 molecular proportion of the phenoxypolyethoxy alcohol. A slight excess of substituted benzyl halide will insure complete reaction of the alcohol and additionally excess substituted benzyl halide may usually be readily removed from the final product.

The alkaline condensation agent is employed in the process of this invention to effect the reaction between the substituted benzyl halide and the phenoxypolyethoxy alcohol and to form the substituted benzyl ether of the phenoxypolyethoxy alcohol. A wide variety of inorganic alkaline agents may be employed including, for example, alkali metals such as sodium and potassium, sodium hydroxide, potassium hydroxide, sodium methoxide, potassium methoxide, sodium ethoxide, potassium butoxide, sodium carbonate, lithium carbonate, barium hydroxide, calcium hydroxide, strontium hydroxide, and the like, and alkaline organic agents, such as, for example, pyridine. As will be hereinafter evident, the amount of alkaline agent most suitably employed is a molar amount, preferably in excess of the molar amount of the phenoxypolyethoxy alcohol. Generally, from about 1.1 to about 1.3 mols of alkaline agent per mol of alcohol have been found particularly desirable. This excess is desirable to assure complete neutralization of the halo-acid formed as a by-product in the process reaction. An excess of the alkaline condensation agent does not interfere with the reaction or the final product desired and may be readily removed from such product.

The reaction is generally advantageously carried out by adding and mixing with agitation, preferably by mechanical means, a phenoxypolyethoxy alcohol having the desired number of ethoxy units with between about 1.0 to about 1.3 mols, per mol of the alcohol, of an alkaline condensation agent until the alkaline condensation agent has been dissolved. Solution of the alkaline condensation agent, preferably an alkali metal hydroxide, is usually accomplished by heating the mixture to from between about 50° C. and 90° C. and/or adding a small amount of water until solution occurs. Thereafter and with continuous agitation there is added to the reaction mixture from about 1.1 to about 1.3 mols, per mol of the phenoxypolyethoxy alcohol, of any of the hereinbefore mentioned substituted benzyl halides. The reaction mixture is then heated at an elevated temperature until a reaction mixture comprising a substituted benzyl ether of the phenoxypolyethoxy alcohol is formed. Reaction by-products present in the mixture usually include unreacted substituted benzyl halide, the alkaline condensation agent and a halide consisting of the reaction product of the halogen and the alkaline condensation product, a substituted benzyl alcohol and water. When desirable the unreacted substituted benzyl halide may be readily separated from the reaction mixture by a variety of well-known methods, such as distillation, fractionation or the like.

The temperature employed in the process of this invention is usually from about 50° C. to about 200° C., preferably in the range of from about 100° C. to about 150° C. If temperatures lower than 50° are employed, incomplete reaction will usually occur. If temperatures above 200° C. are employed, some decomposition of one or both reactants or of the final product will often result.

The time required to complete the reaction will vary to some extent depending upon the temperature, quantities of reactants used, etc. Generally speaking, when temperatures within the preferred range are employed, from about 2 to about 5 hours are usually required to achieve maximum yields. By so proceeding product yields of between 98 to 100% based on the weight of the phenoxypolyethoxy alcohol used are obtained.

It has been found generally desirable to conduct the reaction at atmospheric pressure and in an inert atmosphere such as, for example, an atmosphere of nitrogen. Although the reaction may be conducted in air a portion of the phenol substituent of the alcohol often oxidizes resulting in an off-color darkened product. Also, the reaction may be conducted at super atmospheric pressures, but there is generally no advantage and there is some danger that a portion of the ethoxy groups may be removed from the alcohol.

If desired, the reaction may be carried out in the presence of a volatile inert organic solvent such as, for example, benzene, xylene, toluene and the like. The use of solvents is a matter of choice because the reaction proceeds satisfactorily without a solvent. The resultant product is usually suitable for use as a low foaming detergent without further treatment.

However, if desired, at the conclusion of the reaction, the unused reactants and by-products (e.g., halide compounds, such as halide salts), may be separated or removed from the product by well-known standard procedures such as filtration, decantation and the like. Thus, for example, an inert, volatile hydrocarbon solvent such as benzene, toluene or the like, may be used to aid in the separation of the water from the product. This is not usually necessary and has the disadvantage of adding the step of removing the hydrocarbon solvent from the product layer. Other reaction by-products which may be present, such as, for example, unreacted substituted benzyl halides and substituted benzyl alcohol may be readily removed preferably by steam distillation under reduced pressure during which the product is finally dried, preferably at reduced pressure at any convenient temperature below 200° C.

A particularly advantageous embodiment of the processes of this invention comprises reacting from about 1.0 to about 1.3 molecular proportions of an aliphatic substituted benzyl halide, preferably an alkyl substituted benzyl halide, more preferably dodecyl benzyl halide with about 1 molecular proportion of a phenoxypolyethoxy alcohol containing from between about 10 and about 30, preferably between about 15 and about 25 ethoxy units in the polyethoxy group, in the presence from about 1.1 to about 1.3 molecular proportions, per molecular proportion of said alcohol of an alkaline condensation agent, preferably alkali metal hydroxide, in an inert atmosphere and at a temperature in the range of from about 50° C. to about 200° C. preferably about 100° C. to 150° C. for from about 1 to about 5 hours thereby forming a reaction mixture comprising a substituted benzyl ether of phenoxypolyethoxy alcohol and an alkali metal halide.

Thereafter the aromatic reaction by-products are removed while the reaction mixture is dried, preferably at reduced pressure, more preferably at a pressure of from about 20 to 30 mm. of mercury and at a temperature in the range of from about 100° C. to about 150° C., preferably from about 130° C. to about 140° C. The reaction product so formed is a light, yellowish-white, solid or clear, pale yellow liquid depending upon the number of ethoxy groups in the compound and usually contains an insoluble inorganic halide and is suitable for use as a low foaming detergent or for incorporation in low foaming detergent formulations without further processing. However, if a purer product is desired, the inorganic halide may be removed as hereinbefore described, preferably by filtration.

As will be evident from the specific examples, detergents so prepared are water-soluble and have "cloud points" in the range of from about 3° C. to about 30° C. The term "cloud point" is art-recognized as a measure of the relative hydrophilic properties of detergent compounds and is the temperature at which turbidity appears in a 1% aqueous detergent solution when that solution is warmed or heated from a cooler temperature to the temperature at which turbidity appears in the solution.

*Composition description*

The present invention also provides, in part, novel compositions comprising a mixture of (1) one or more of a novel class of compounds having the general formula:

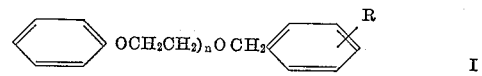
I where R is an organic radical in the ortho, meta or para position, and is characterized in being incapable of undergoing a reaction with an alcohol or ethylene oxide, and where $n$ is a number of about 10 to about 30, and (2) an inorganic compound, preferably a water-soluble inorganic compound which enhances or increases the detergent efficiency of such novel compounds.

In the class of compounds having the general formula referred to immediately above and in the earlier part of this specification, the organic radical R may be any of a wide variety of organic materials heretofore defined.

Particularly advantageous compounds suitable for inclusion in the compositions of this invention and falling within the scope of the previously described Formula I are compounds in which R is an aliphatic radical having the significance hereinbefore described, and $n$ is a number between about 15 and about 25. Compounds of this class are generally stable, water-soluble, liquid or solid detergent compounds, and are characterized in being low foaming and in having high detergency when incorporated in compositions which are dissolved in water. Compositions or formulations containing these compounds are particularly useful in operations where foam is undesirable and high detergency is necessary or required, such as, for example, in dishwashing and laundering operations.

In other advantageous compositions containing compounds within the scope of previously described Formula I, R may be any of the hereinbefore described aliphatic radicals. However, when the number of ethoxy units $n$ are below 10, in such formula the compounds generally have limited water solubility and, therefore, limited utility when incorporated in the compositions of the present invention. On the other hand, when the ethoxy units are above 30, the compounds will tend to foam in compositions unless the aliphatic group or radical R is a long-chain radical and containing more than 30 carbon atoms.

A class of compounds falling within the scope of the previously described general formula which are preferred for inclusion in the compositions of this invention are compounds in which R is an alkyl group having the significance hereinbefore described and having about 8 to about 20 carbon atoms, and $n$ is a number of from between about 15 to about 25.

Particularly advantageous compositions of this invention include one or more dodecylbenzyl ethers of phenoxypolyethoxy ethanol having the general formula:

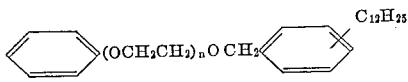
II where $n$ is a number of about 15 to about 25. Compositions containing this class of compounds are stable water-soluble detergent compositions with low foaming characteristics and have significantly better detergency than the previously known detergent compositions hereinbefore described.

The compositions of this invention, as previously noted, comprise a mixture of (1) a substituted benzyl ether of a phenoxypolyethoxy ethanol, and (2) an inorganic compound. In these compositions the amount of the substituted benzyl ether of a phenoxypolyethoxy alcohol will vary depending upon the contemplated use of the composition but is advantageously from about 0.5 to about 20% by weight, based on the weight of the composition. The inorganic compound employed may be any of a wide variety of water-soluble and water-insoluble inorganic compounds and mixtures thereof and will, in general, depend on the intended end use of the composition. Thus, for example, when a dishwashing or laundering composition is contemplated, the inorganic compound is usually one which enhances the detergent efficiency of the organic detergent component of the composition and may be an alkaline water-soluble inorganic salt or a mixture of alkaline, water-soluble inorganic salts, preferably those inorganic salts which are employed as detergent builders. As examples of such salts may be mentioned tri-alkali metal phosphates such as trisodium phosphate and tripotassium phosphate; dialkali metal hydrogen phosphates such as disodium hydrogen phosphate and dipotassium hydrogen phosphate; the alkaline water-soluble molecularly dehydrated alkali metal phosphate salts such as the alkali metal pyrophosphates, for example, tetrasodium pyrophosphate, tetrasodium hydrogen pyrophosphate and tetrapotassium pyrophosphate, also the alkali metal tripolyphosphates such as sodium tripolyphosphate ($Na_5P_3O_{10}$) and potassium tripolyphosphate; the water-soluble alkali metal metaphosphates such as sodium hexametaphosphate; the water-soluble alkali metal silicates such as sodium silicates having an $Na_2O$ to $SiO_2$ mol ratio of 1:1 to 1:3.6, preferably 1:1 to 1:3.5 and the corresponding potassium silicates; the water-soluble alkali metal borates such as calcined sodium tetraborate or borax; and the water-soluble alkali metal carbonates or bicarbonates such as sodium or potassium carbonates.

The above salts can be used alone or in various combinations with each other or with water-soluble, neutral, inert diluents, which may also have some detergent building properties, for example, water-soluble, neutral, inert alkali metal salt diluents such as neutral alkali metal salt diluents such as neutral alkali metal sulfates or chlorides, for example, sodium sulfate or sodium chloride.

The proportions of the salts employed in the compositions of this invention can be varied considerably depending on the end use of the composition, but is usually in excess of 40% and up to about 96% by weight of the solids content of the composition. Of this, the alkaline alkali metal salts usually comprise from about 10% to about 95% by weight of total salts, and the inert diluent salt usually is used in amounts of about 95% to about 5% by weight of total salts.

Although the compositions of this invention preferably consist essentially of the substituted benzyl ether of a phenoxypolyethoxy alcohol and the alkaline salts or combinations thereof with the inert diluent salts previously described herein, the compositions may, under certain circumstances, contain water-insoluble compounds. For example, when a scouring composition is desired, the compositions may also contain relatively large amounts usually from about 70% to about 90% of a water-insoluble inorganic compound having abrasive properties such as, for example, powdered talc, a finely-divided diatomaceous earth, or a kaolinite clay, in addition to the aforementioned ingredients.

Compositions containing the above-described ingredients are generally characterized in having good detersive action and usually develop very little, if any, amount of foam under the usual end use conditions. The compositions of this invention may also contain minor amounts, usually less than 10%, preferably less than 5%, by weight of anionic wetting agents, including, for example, sodium salts of long-chain alkyl sulfates, sodium salts of alkyl naphthalene sulfonic acids, sodium salts of sulfonated abietenes, sodium salts of alkyl benzene sulfonic acids, particularly those in which the alkyl group contains between 8 and 24 carbon atoms, sodium salts of sulfonated mineral oils, and sodium salts of sulfo succinic esters such as sodium dioctylsulfo-succinate.

In this latter category of anionic wetting agents, which fall within the broader category of anionic surface active agents, particularly non-soap synthetic, anionic organic detergents, there can be included the anionic surfactants, such as the sulfated and the sulfonated alkyl, aryl, and alkylaryl hydrocarbons set forth in U.S. Patent 2,846,398, line 54 of column 3 to line 6 of column 5.

The portion of U.S. Patent 2,846,398 relating to certain preferred anionic organic surface active agents which have been found to be particularly advantageous in the compositions of this invention appears in column 4, lines 35 to 75 and column 5, lines 1 to 74, and are quoted below.

"The organic anionic detergents of this invention include in addition to the preferred alkali metal fatty acid soaps the well known surface-active alkali metal sulfonates and sulfates, which may be employed as the sole detergent base or in admixture with the alkali metal fatty acid soaps (e.g. one part of the fatty acid soap to 0.5 to 2 parts by weight of the surface-active alkali metal sulfonate or sulfate or mixture thereof) as the detergent base. A preferred group of this class is the long chain alkyl aryl sulfonates, i.e. those wherein the alkyl radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

"Other sulfonate surface-active agents are contemplated also, e.g. the long chain alkyl sulfonates such as sodium hexadecane sulfonate and sodium octadecane sulfonate.

"The well-known sulfate detergents having 12 to 26 carbon atoms and particularly those having an acyl radical of about 8 to 22 carbon atoms may be employed as anionic detergent bases in accordance with this invention. Such detergents include the sulfuric acid esters of polyhydric alcohols incompletely esterified with fatty acid, e.g. sodium cocoanut oil monoglyceride monosulfate, sodium tallow diglyceride monosulfate, the pure and mixed higher alkyl sulfates such as sodium lauryl sulfate and sodium cetyl sulfate.

"Additional anionic surface-active sulfonates and sulfates contemplated by this invention are the sulfated and sulfonated alkyl acid amides such as Igepon T

the sulfated and sulfonated esters such as Igepon AP (RCOOCH$_2$SO$_3$Na where R is an alkyl radical containing from 12 to 18 carbon atoms), sodium salt of the bisulfate of a dialkyl dicarboxylate, sodium salt of the sulfonic acid derivative of a dialkyl dicarboxylate, sodium sulfosuccinic esters such as $$NaOOCCH_2CH(SO_3Na)CONHC_{18}H_{37}$$

and the like."

Other typical examples of the anionic surface active agents, i.e. anionic wetting agents, are described in Schwartz and Perry, "Surface Active Agents," Interscience Publishers, New York (1949) and The Journal of American Oil Chemists Society, vol. 34, No. 4, pages 170–216 (April 1957). It should be noted, however, that the quantity and type of anionic wetting agents should not be such as to prevent the desired end result, i.e. a low foaming (detergent) composition. Consequently, the said agent must be compatible with the novel compounds of the present invention.

Compositions which have been found to be particularly useful in laundering operations contain minor amounts usually less than 2% by weight of certain organic compounds which serve as antiredeposition agents in addition to one or more of the above disclosed ingredients. Examples of such agents include, for example, sodium carboxymethyl cellulose, starch, polyvinyl alcohol, polyvinyl pyrollidone and the like. Also, the laundering compositions may additionally contain minor amounts, usually less than 0.5% by weight of a wide variety of aromatic organic compounds such as perfumes as well as fluorescent dyes commonly known in the art as optical brighteners.

In regard to optical brighteners, which are generally known in the art as fluorescent brightening agents or optical bleaching agents, examples of said brighteners are described in Venkataraman, "Chemistry of Synthetic Dyes," Academic Press, Inc., New York, 1952, and U.S. Patent 2,930,760.

Additional materials which may be incorporated in the compositions of the present invention in the aforementioned minor amounts include organic sequestering or chelating agents such as the metal salts of ethylenediamine tetra-acetic acid, and organic stain, corrosion, or tarnish inhibitors such as those described in U.S. Patents 2,618,603, 2,618,605, 2,618,606, 2,618,607 and 2,618,608. In order to avoid the enlargement of the present specification, the subject matter relating to surface active agents, optical brighteners, etc., of all the aforementioned publications including the aforementioned patents is incorporated herein by reference. The quantity and type of surface active agents, optical brighteners, inhibitors, etc., should not be such as to prevent the novel compositions from having the low foaming characteristic which is obtained from the incorporation therein of the novel compounds of the present invention. Stated differently, these aforementioned materials must be compatible with the said novel compounds and not inhibit their function in the said compositions.

The various ingredients referred to herein can be used in the compositions of this invention in various proportions or in certain instances can be excluded from the compositions depending upon whether the composition is to be used as a laundering composition, a dishwashing composition, a scouring composition, etc. However, in general, the compositions will contain on a dry basis from about 0.5% to about 20% by weight of the substituted benzyl ether of a phenoxypolyethoxy ethanol, the remainder comprising one or more of the hereinbefore described alkaline alkali metal salts or combinations thereof with the inert diluent salts, moisture usually in the form of water of hydration, and one or more of the other hereinbefore described additional components or ingredients. In the case of aqueous compositions, the ingredients or components are normally present in the compositions on the same solids basis, but the compositions may contain from 30% to 99% by weight of water.

In one embodiment of this invention the compositions comprise a mixture of from about 0.5% to about 20% by weight of the substituted benzyl ether of phenoxypolyethoxy ethanol wherein the polyethoxy portion of the ether contains from between about 10 and 30 ethylene oxide groups, and where the substituent of the substituted benzyl group is an organic radical, preferably an aliphatic radical, and an inorganic compound, preferably a water-soluble salt selected from inorganic alkaline water-soluble alkali metal detergent builder salts or mixtures thereof, together with a water-soluble inorganic neutral alkali metal salt. In such composition the alkaline water-soluble detergent builder salt is preferably an alkali metal phosphate, more preferably sodium tripolyphosphate.

In another embodiment of such composition the alkaline water-soluble detergent builder salt is an alkali metal carbonate.

In a further embodiment of this invention, the compositions comprise a mixture of from about 0.5% to about 20%, preferably from about 0.5% to 15%, by weight of a dodecylbenzyl ether of a phenoxypolyethoxy ethanol wherein the polyethoxy portion of the ether contains from about 10 to about 30, preferably from about 15 to about 25, ethylene oxide groups, and a water-soluble salt selected from the group consisting of inorganic alkaline water-soluble alkali metal salts and mixtures thereof, together with a water-soluble inert inorganic neutral alkali metal salt, preferably sodium chloride, sodium sulfate, or mixtures thereof, and from about 0.5% to about 10% by weight of water in the form of water of hydration.

In a preferred embodiment of this invention, the composition consists essentially of from about 0.5 to about 20% by weight of a mixture of the above-described dodecylbenzyl ether of a phenoxypolyethoxy ethanol, containing from about 15 to about 25 ethylene oxide groups, from about 10 to about 60% by weight of sodium tripolyphosphate and the balance consisting of sodium sulfate.

In another preferred embodiment of this invention, the compositions comprise a mixture of from about 5% to 20% by weight of a dodecylbenzyl ether of a phenoxypolyethoxy ethanol, containing from about 15 to about 25 ethylene oxide groups, from about 20 to about 55% by weight of sodium tripolyphosphate, from about 30 to about 2% by weight of sodium metasilicate, from about 10 to 0.5% by weight of water in the form of water of hydration, and the balance of the composition consisting substantially of a mixture of sodium carbonate.

A preferred laundering composition of this invention consists essentially of a mixture of from about 5 to about 15% by weight of the dodecylbenzyl ether of a phenoxypolyethoxy ethanol having from about 15 to about 25 ethylene oxide groups, from about 35% to about 50% by weight of sodium tripolyphosphate, from about 40% to about 15% by weight of trisodium phosphate, from about 2% to about 10% by weight of sodium metasilicate, from about 3% to about 0.15% by weight of sodium carboxymethylcellulose, from about 0.01% to about 0.5% by weight of an optical brightener, and the balance of the composition consisting substantially of water, usually in the form of water of hydration.

In the above composition a portion of the dodecylbenzyl ether may often be advantageously replaced with an anionic detergent, preferably the sodium salt of an alkyl benzene sulfonic acid having from between 8 and 24 carbon atoms in the alkyl group. Such compositions usually comprise from about 3% to about 10% by weight of the aforementioned dodecylbenzyl ether of a phenoxypolyethoxy ethanol and from about 3 to 10% by weight of an anionic detergent, the balance of the composition having the ingredients in substantially the proportions above described.

A preferred dishwashing composition of this invention comprises a mixture of from about 0.5 to about 5% by weight of a dodecylbenzyl ether of a phenoxypolyethoxy ethanol, containing from about 15 to about 25 ethylene oxide groups, from about 5% to about 65% by weight of sodium tripolyphosphate, from 5 to about 20% by weight of sodium metasilicate, and the balance of the composition consisting substantially of water, usually in the form of water of hydration.

As is evident from the foregoing, the proportions and kind of ingredients employed in a formulation will depend on the purpose for which the formulation or composition is being used, that is whether it is to be used for laundering, dishwashing or as a scouring composition. Irrespective of the use involved, however, the compositions containing the substituted benzyl ether of a phenoxypolyethoxy ethanol have increased detergent activity and significantly lower foam-forming characteristics, based on the detergency attained, than the low foaming, non-ionic detergent compositions previously described.

The foaming and wetting characteristics of representative compounds and compositions falling within the scope of this invention are set forth in the specific examples and may be determined by the Ross-Miles method described in "Detergency Evaluation and Testing," Interscience Publishers, Inc., New York (1954), by J. C. Harris. The foam test measures the depth of a foam layer produced by a standard solution of a detergent composition when agitated under controlled conditions. The wettability test measures the time required for a solution of a composition to wet a standardized soiled surface. As will be evident from the specific examples, the detergent compositions of this invention are non or very low foaming compositions and yet have detergency properties superior to compositions containing the hereinbefore mentioned benzyl ethers of octylphenoxypolyethoxy ethanol.

The detersive properties of the compositions of this invention may be determined by detergency tests described by J. C. Harris in a series of articles in the publication "Soap and Sanitary Chemicals," for August and September of 1943.

In accordance with one method, the detersive effectiveness of representative compounds and compositions of this invention have been compared with that of a known high detersive, high foaming product known to the trade as Gardinol which is used as a reference equal to 100. As will be evident from the specific examples, the compounds and compositions of this invention exhibit significantly better detergency than previously known compounds and compositions hereinbefore described.

A further understanding of the novel compounds of this invention, as well as the utility and the processes of preparing these compounds, and compositions containing said compounds, may be obtained from the following specific examples which are intended to illustrate the invention, but not to limit the scope thereof, parts and percentages being by weight unless otherwise specified.

EXAMPLE I

Into a flask equipped with an electric stirrer and a thermometer there was added 674.4 parts of a phenoxypolyethoxy ethanol having the formula

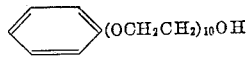

An atmosphere of nitrogen was maintained in the flask by slowly and continuously passing a current of dry nitrogen gas over the contents. There was then added, with agitation a solution containing 52.7 parts of sodium hydroxide and 23 parts of water and the mixture was stirred until the sodium hydroxide had completely dissolved. To this mixture, and while agitation was continued there was added 369.2 parts of dodecyl benzyl chloride. The resulting reaction mass was heated with agitation at a temperature of between 110° C. to 120° C. for 5 hours.

The liquid, turbid reaction mixture so obtained consisted preponderantly of the dodecyl benzyl ether of the phenoxypolyethoxy ethanol, and also contained minor amounts of NaCl, water and trace amounts of unreacted dodecyl benzyl chloride. The mixture was then heated under partial vacuum at a temperature of between 130° C. to 140° C. at a pressure of between 20 and 30 mm. of mercury for about 40 minutes to remove the water. Thereafter the mixture was cooled to room temperature, the contents removed from the reaction flask and filtered through filter paper in a Buchner funnel to remove the NaCl. Nine hundred ninety parts of a clear yellow liquid were obtained representing a yield of 99.97 of that theoretically obtainable, based on the phenoxypolyethoxy ethanol originally changed. The liquid product had a molecular weight of 972. A 1% aqueous solution of the liquid had a cloud point of 3.0° C.

The same product was obtained when the above procedure was repeated using dodecyl benzyl bromide in place of the dodecyl benzyl chloride employed in that example. Both of these products exhibited good washing, low foaming and detergent characteristics when incorporated in detergent compositions and evaluated as hereinafter edscribed in Example II.

EXAMPLE II

Into a flask equipped with an electric stirrer and a thermometer, there was added 302 parts of phenoxypolyethoxy ethanol having the formula

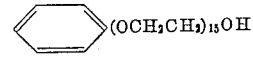

An atmosphere of nitrogen was maintained in the flask by slowly and continuously passing a current of dry nitrogen over the contents. There was then added with agitation an aqueous solution containing 24.4 parts of KOH and 16 parts of water, and the mixture was stirred until the KOH solution had completely dissolved. To this mixture and while agitation was continued there was added 118 parts of dodecyl benzyl chloride. The resulting reaction mass was heated with agitation at a temperature of from between 110° to 120° C. for 3½ hours.

The liquid, turbid reaction mixture so obtained consisted preponderantly of the dodecylbenzyl ether of the phenoxypolyethoxy ethanol and contained minor amounts of KCl, water and trace amounts of unreacted dodecyl benzyl chloride. The mixture was then heated under partial vacuum at a temperature of between 130° C. to 140° C., at a pressure of between 20 and 30 mm. of mercury to remove the water and unreacted dodecyl benzyl halide. Thereafter the mixture was cooled to room temperature, the contents removed from the reaction flask and filtered through filter paper in a Buchner funnel to remove KCl. Four hundred four parts of a clear yellow liquid were obtained representing a yield of greater than 99% of that theoretically possible based on the phenoxypolyethoxy alcohol originally charged. The liquid product had a molecular weight of 1,012. A 10% aqueous solution had a cloud point of 8.5° C. This product exhibited good washing and detergent characteristics when evaluated as hereinafter described in Example V.

The procedure of Example II was repeated, except that the reaction was conducted in an atmosphere of air instead of the atmosphere of nitrogen employed in that example. A yellowish brown liquid product, having properties similar to the product of Example II was obtained.

EXAMPLE III

Into a flask equipped with an electric stirrer and a thermometer there was added 206 parts of phenoxypolyethoxy ethanol having the formula

An atmosphere of nitrogen was maintained in the flask by slowly and continuously passing a current of nitrogen over the contents. There was then added with agitation a solution containing 18.4 parts of KOH and 16 parts of water and the mixture was stirred until the KOH had completely dissolved. To this mixture and while agitation was continued there was added 88 parts of dodecyl benzyl chloride. The resulting reaction mass was heated with agitation at a temperature of between 130° C. to 140° C. for 3 hours.

The reaction mixture so obtained consisted preponderantly of the dodecylbenzyl ether of the phenoxypolyethoxy alcohol and contained minor amounts of KCl, water and trace amounts of unreacted dodecyl benzyl chloride. Stirring was discontinued. Fifty parts of water and 250 parts of toluene were added to the flask and the mixture upon settling formed a product-toluene top layer and a lower or bottom aqueous layer. The aqueous layer was removed and discarded and the product-toluene layer was steam stripped to remove unreacted dodecylbenzyl chloride and toluene. The resulting product was dried by heating 130° C. to 140° C. for 30 minutes. A product yield of 382 parts, representing 99% of that theoretically obtainable based on the phenoxypolyethoxy alcohol charged, was obtained. The product was a yellowish white solid and had a molecular weight of 1,276. The cloud point of a 1% aqueous solution was 23.8° C.

The procedure of Example III was repeated except that 4-beta-naphthyl benzyl chloride was reacted with the phenoxypolyethoxy alcohol of that example to give the beta naphthyl benzyl ether of the phenoxypolyethoxy alcohol. Both products when incorporated in detergent formulations as hereinafter described exhibited excellent washing, low foaming and detergent characteristics.

EXAMPLE IV

Into a flask equipped with an electric stirrer and a thermometer there was added 342.2 parts of a phenoxypolyethoxy ethanol having the formula

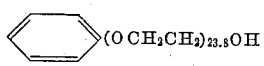

An atmosphere of nitrogen was continuously maintained in the flask by slowly and continuously passing a current of dry nitrogen gas over the contents. There was then added with agitation a solution containing 18.4 parts of KOH and 16 parts of water and the mixture was stirred until the KOH had completely dissolved. To this mixture and while agitation was continued there was added 88.4 grams of dodecyl benzyl chloride. The resulting reaction mass was heated with continuing agitation at a temperature of between 100° C. to 110° C. for 5 hours.

The reaction mixture so obtained consisted preponderantly of the dodecyl benzyl ether of the phenoxypolyethoxy alcohol and also contained minor amounts of KCl, water and trace amounts of dodecyl benzyl chloride.

The mixture was then heated under partial vacuum at a temperature of 130° C. to 140° C. and a pressure of between 20 to 30 mm. of mercury to remove water, and the unreacted dodecyl benzyl chloride. The product was then filtered with suction through filter paper in a Buchner funnel and permitted to cool. A yield of 420 parts of a solid dodecyl benzyl ether of the phenoxypolyethoxy alcohol was obtained. The yield represented 99% of that theoretically possible based on the amount of phenoxypolyethoxy alcohol charged. The product in a 1% aqueous solution had a cloud point of 25° C. and exhibited excellent washing, low foaming and detergency characteristics.

The procedure of Example IV was repeated except that para-(4-butylphenyl) benzyl bromide instead of dodecyl benzyl chloride was reacted with the phenoxypolyethoxy alcohol under the above described conditions. The solid product para-(4-butylphenyl) benzyl ether of phenoxypolyethoxy alcohol, having excellent washing, low foaming and detergent properties, was obtained.

In another experiment the procedure of Example IV was repeated except that octylbenzyl bromide instead of dodecyl benzyl chloride was reacted with the phenoxypolyethoxy alcohol of that experiment. A solid product, the octylbenzyl ether of the phenoxypolyethoxy alcohol, having excellent washing detergent and low foaming properties, was obtained.

EXAMPLE V

The dodecyl benzyl ethers of phenoxypolyethoxy alcohols prepared in Examples I through IV designated hereinafter, respectively as products I through IV, were incorporated in dry mixed compositions containing the ingredients listed below in the stated proportions.

TABLE 1

| Ingredient | Composition | | | | |
|---|---|---|---|---|---|
| | A | B | C | D | E |
| Product I | 3.0 | | | | |
| Product II | | 3.0 | | | |
| Product III | | | 3.0 | | 1.5 |
| Product IV | | | | 3.0 | 1.5 |
| Sodium Tripolyphosphate | 48.0 | 45.0 | 45.0 | 48.0 | 48.0 |
| Sodium Sulfate | 34.5 | 37.5 | 40.5 | 34.5 | 34.5 |
| Sodium Silicate | 14.5 | 14.5 | 11.5 | 14.5 | 14.5 |

The above compositions and detergent compounds were evaluated for washing, detergency and foaming characteristics using the previously described methods of Harris.

TABLE 2

| Product | Detergency (Percent of Standard) | Ross-Miles Foam Test (cm of Foam) |
|---|---|---|
| A | 31 | 0 |
| B | 34 | 0 |
| C | 86 | 0.7 |
| D | 90 | 0 |
| E | 92 | 0 |
| I | 30 | 0 |
| II | 33 | 0.6 |
| III | 85 | 0.7 |
| IV | 90 | 0 |

The foregoing table indicates that all of both the detergent compositions and compounds exhibit little or substantially no foam. The table also indicates that compositions C, D, E and detergent products III and IV have substantially the same detergency as standard high foaming detergents. By way of contrast, when a commerically available detergent product, e.g. a nonsubstituted benzyl ether of octylphenoxypolyethoxy alcohols containing 20 ethylene oxide groups as disclosed in U.S. Patent 2,856,434 was incorporated in the above detergent formulations and tested both in formulations and per se as above described, the detergency was 53% of that of the standard high foaming detergent. On the other hand, products III and IV containing 21 and 23.8 ethylene oxide groups in the polyethoxy alcohol exhibited a detergency respectively equal to 85% and 90% of the detergency of the standard high foaming detergent. These detergents produced traces of foam in each instance.

EXAMPLE VI

Additional quantities of dodecylbenzyl ethers of phenoxypolyethoxy alcohols were prepared as described in Examples I through IV and designated hereinafter as compounds E, F, G and H respectively; these were incorporated in dry-mixed compositions containing the ingredients listed in the stated proportions in Tables 3 and 4.

Tables 5 and 6 indicate that laundering and dishwashing compositions containing the dodecylbenzyl ethers of phenoxypolyethoxy alcohols containing 21 and 23.8 ethylene oxide groups have substantially the same detergency as standard high-foaming detergent compositions or detergents (e.g. Gardinol). By way of contrast, when a commercially available detergent composition, e.g. a composition containing an unsubstituted

TABLE 3.—LAUNDERING COMPOSITIONS

| Ingredient | Composition ||||||||||
|---|---|---|---|---|---|---|---|---|---|---|
| | 1 | 2 | 3 | 4 | 5 | 6 | 7 | 8 | 9 | 10 |
| Compound E | 10.0 | | | | | | | | | |
| Compound F | | 10.0 | | | | | | | | |
| Compound G | | | 10.0 | | 5.0 | 7.5 | 12.0 | 12.0 | 12.0 | 12.0 |
| Compound H | | | | 10.0 | 5.0 | | | | | |
| Sodium Tripolyphosphate | 40.0 | 40.0 | 40.0 | 40.0 | 40.0 | 35.0 | 30.0 | 45.0 | 40.0 | 45.0 |
| Tetrasodium Pyrophosphate | | | | | | 10.0 | 15.0 | | | |
| Sodium Carbonate | | | | | | | 10.0 | | | |
| Sodium Sulfate | 40.0 | 40.0 | 40.0 | 40.0 | 40.0 | 25.0 | 23.0 | 20.0 | 40.0 | 35.0 |
| Sodium Chloride | | | | | | 10.0 | | 13.0 | | |
| Sodium Silicate | 5.0 | 5.0 | 5.0 | 5.0 | 5.0 | 4.0 | 4.0 | 4.2 | 5.0 | 5.0 |
| Sodium Carboxymethyl cellulose | 0.7 | 0.7 | 0.7 | 0.7 | 0.7 | 0.9 | 0.9 | 0.7 | 0.7 | 0.9 |
| Optical brightner* | 0.1 | 0.1 | 0.1 | 0.1 | 0.1 | 0.1 | 0.1 | 0.1 | 0.1 | 0.1 |
| Water (as water of Hydration) | 4.2 | 4.2 | 4.2 | 4.2 | 4.2 | 5.0 | 5.0 | 5.0 | 2.2 | 2.0 |
| Sodium dodecylbenzene sulfonate | | | | | | 2.5 | | | | |

*[e.g., U.S. Patent 2,930,760, fluorescent brightener—sodium 4,4'-bis (4,6-dianilino-s-triazo-2-ylamino) 2,2' stilbene disulfonate].

TABLE 4.—DISHWASHING COMPOSITIONS

| Ingredient | Composition ||||||||
|---|---|---|---|---|---|---|---|---|
| | 11 | 12 | 13 | 14 | 15 | 16 | 17 | 18 |
| Compound E | 3.0 | | | | | | | |
| Compound F | | 3.0 | | | | | | |
| Compound G | | | 3.0 | | 3.0 | 3.0 | 3.0 | 3.0 |
| Compound H | | | | 3.0 | | | | |
| Sodium tripolyphosphate | 30.0 | 30.0 | 30.0 | 30.0 | 35.0 | 20.0 | | 35.0 |
| Trisodium phosphate | 30.0 | 30.0 | 30.0 | 30.0 | 30.0 | 20.0 | 30.0 | 35.0 |
| Tetrasodium pyrophosphate | | | | | | 20.0 | 30.0 | |
| Sodium Carbonate | 20.0 | 20.0 | 20.0 | 20.0 | 9.0 | 20.0 | 20.0 | 4.0 |
| Sodium Silicate | 10.0 | 10.0 | 10.0 | 10.0 | 15.0 | 10.0 | 10.0 | 15.0 |
| Water (as hydration) | 7.0 | 7.0 | 7.0 | 7.0 | 8.0 | 7.0 | 7.0 | 8.0 |

Aqueous solutions of the above compositions of Tables 3 and 4 were evaluated for detergency wetting and foaming characteristics, using the methods of Harris previously referred to in the disclosure. The results of these evaluations are shown in Tables 5 and 6.

TABLE 5.—CHARACTERISTICS OF LAUNDERING COMPOSITIONS

| Composition | Detergency (Percent of Standard) | Wetting times (seconds) | Ross-Miles Foam Test (cm. of foam) |
|---|---|---|---|
| 1 | 85.0 | 12.0 | 0.7 |
| 2 | 86.0 | 12.0 | 0.3 |
| 3 | 93.0 | 7.0 | 0.3 |
| 4 | 90.0 | 21.0 | 0.9 |
| 5 | 92.0 | 15.0 | 0.5 |
| 6 | 96.0 | 12.0 | 1.1 |
| 7 | 91.0 | 7.0 | 0.3 |
| 8 | 91.0 | 8.0 | 0.3 |
| 9 | 90.0 | 7.0 | 0.3 |
| 10 | 90.0 | 7.0 | 0.4 |

TABLE 6.—CHARACTERISTICS OF DISHWASHING COMPOSITIONS

| Composition | Detergency (Percent of Standard) | Wetting times (seconds) | Ross-Miles Foam Test (cm. of foam) |
|---|---|---|---|
| 11 | 31 | 21 | 0 |
| 12 | 34 | 21 | 0 |
| 13 | 86 | 12 | 0.6 |
| 14 | 90 | 12 | 0 |
| 15 | 87 | 12 | Trace |
| 16 | 86 | 12 | Trace |
| 17 | 86 | 12 | Trace |
| 18 | 86 | 12 | Trace | benzylether of an octylphenoxypolyethoxy alcohol containing 20 ethylene oxide groups as disclosed in U.S. Patent 2,856,434, was incorporated in the above detergent formulations, i.e., instead of compounds E–H, and tested; the detergency was about 30% of that of the standard high-foaming detergent. On the other hand, all of compositions 1 through 10, that is the laundering compositions, showed a detergency equal to or greater than 85% of the standard high-foaming detergent.

Tables 5 and 6 also show that dishwashing compositions 13 through 18 exhibit a high detergency activity compared with aforementioned high foaming standard. By way of contrast, dishwashing compositions like those set forth above and containing a prior art (U.S. Patent 2,856,434) low foaming detergent (e.g. an unsubstituted benzyl ether of an octylphenoxypolyethoxy alcohol) used instead of compounds E–H, showed only 25% detergency when compare with the high foaming standard. Tables 5 and 6 also show that the compositions of this invention have a high degree of wettability, that is, the time required to wet a standard soiled surface. The wetting times of the laundering and dishwashing compositions of this invention in no instance exceeded 21 seconds. By way of contrast, laundering and dishwashing compositions in which the above-mentioned low foaming prior art detergent was substituted in the compositions of this invention in place of the substituted benzyl ethers of phenoxypolyethoxy alcohol generally had wetting times of from 35 to 40 seconds.

The foregoing tables also indicate that the laundering and dishwashing compositions of this invention are low foaming, that is, they exhibit little or substantially no foam and in this respect are generally comparable to the prior art detergent compositions, although the compositions of this invention are markedly superior with respect to detergent activity and wettability.

What is claimed is:

1. A low foam high detergency composition consisting essentially of a mixture of (1) from about 0.5% to about 20% by weight of a compound having the formula

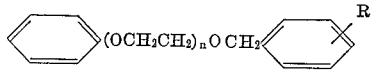

where R is an organic radical characterized in being incapable of undergoing a reaction with ethylene oxide and is selected from the group consisting of (a) an unsubstituted aromatic radical selected from the group consisting of phenyl, benzyl, alpha- and beta-naphthyl, pyridyl, quinonyl, and anthryl radicals, (b) substituted aromatic radicals selected from the group consisting of halo-, nitro-, and alkyl-substituted phenyl, benzyl, alpha- and beta-naphthyl, pyridyl, quinonyl, and anthryl radicals, in which the alkyl substituent contains from about 1 to about 20 carbons in the alkyl group, and (c) unsubstituted aliphatic radicals containing from about 8 to about 20 carbon atoms and $n$ is a number of about 21 to about 30, and (2) a water-soluble salt selected from the group consisting of inorganic alkaline, water-soluble alkali-metal detergent builder salts selected from the group consisting of alkali metal phosphates, silicates, borates, carbonates, bicarbonates, and mixtures thereof together with a water-soluble, inert, inorganic neutral alkali metal salt selected from the group consisting of alkali metal sulfates, chlorides and mixtures thereof.

2. A composition as in claim 1 but further characterized in that the phosphate is sodium tripolyphosphate.

3. A low foam-high detergency composition consisting essentially of a mixture of (1) from about 0.5% to about 20.0% by weight of a compound having the formula

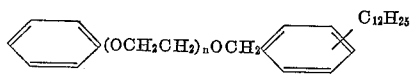

where $n$ is a number of about 21 to about 25, and (2) an alkaline, water soluble alkali metal phosphate.

4. A detergent low foam-high detergency composition consisting essentially of a mixture of (1) from about 0.5% to about 15.0% by weight of a compound having the formula

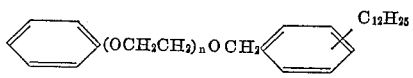

where $n$ is a number of about 21 to about 25, (2) a water-soluble salt selected from the group consisting of inorganic, alkaline, water-soluble, alkali-metal detergent builder salts selected from the group consisting of alkaline, water soluble alkali metal phosphates, silicates, borates, carbonates and bicarbonates, and mixtures thereof together with a water-soluble, inert, inorganic, neutral alkali metal salt selected from the group consisting of water soluble, inert alkali metal sulfates, chlorides and mixtures thereof, and (3) from about 0.5% to about 10% by weight of water in the form of water of hydration.

5. A low foam-high detergency composition consisting essentially of a mixture of (1) from about 0.5% to about 20% by weight of a compound having the formula

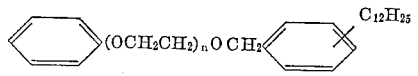

where $n$ is a number of about 21 to about 25, (2) from about 10% to about 60% by weight of sodium tripolyphosphate, and (3) sodium sulfate.

6. A low foam-high detergency composition consisting essentially of a mixture of (1) from about 0.5% to about 20.0% by weight of a compound having the formula

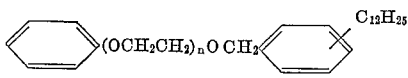

where $n$ is a number of about 21 to about 25, (2) from about 20% to about 55% by weight of sodium tripolyphosphate, (3) from about 30% to about 2% by weight of sodium metasilicate, (4) from about 10% to 0.5% by weight of water, and (5) the balance of said composition consisting essentially of a mixture of sodium sulfate and sodium carbonate.

7. A low foam-high detergency laundering composition consisting essentially of a mixture of (1) from about 5% to about 15% by weight of a compound having the general formula

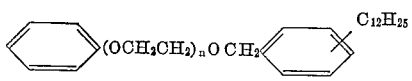

where $n$ is a number of about 21 to about 25, (2) from about 35% to about 50% by weight of sodium tripolyphosphate, (3) from about 40% to about 15% by weight of sodium sulfate, (4) from about 2% to about 10% by weight of sodium metasilicate, (5) from about 0.3% to about 1.5% by weight of sodium carboxy-methyl cellulose, (6) from about 0.01 to about 0.5% by wegiht of an optical brightener, the balance of said composition being water.

8. A low foam-high detergency laundering composition consisting essentially of a mixture of (1) 3% to about 10% by weight of a compound having the general formula

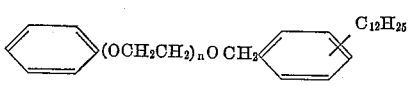

where $n$ is a number of about 21 to about 25, (2) from about 3% to about 10% by weight of an anionic detergent, (3) from about 35% to about 50% by weight of sodium tripolyphosphate, (4) from about 35% to about 10% by weight of sodium sulfate, (5) from about 2% to about 10% by weight of sodium metasilicate, (6) from about 0.3% to about 1.5% by weight of sodium carboxymethyl cellulose, (7) from about 0.01% to about 0.5% by weight of an optical brightener, the balance of said composition consisting essentially of water.

9. A low foam-high detergent dishwashing composition consisting essentially of a mixture of (1) from about 0.5% to about 5.0% by weight of compound having the formula

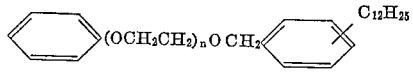

where $n$ is a number of about 21 to about 25, (2) from about 5% to about 65% of sodium tripolyphosphate, (3) from about 65% to about 5% by weight of trisodium phosphate, (4) from about 5% to about 20% by weight of sodium metasilicate, the balance of said composition being water.

References Cited

UNITED STATES PATENTS

| | | | |
|---|---|---|---|
| 1,970,578 | 8/1934 | Schoeller et al | 252 |
| 2,550,691 | 5/1951 | Harris | 252 |
| 2,596,091 | 5/1952 | Benneville | 252—135 |
| 2,856,434 | 10/1958 | Niederhauser et al. | 252 |
| 3,169,930 | 2/1965 | Gedge | 252—135 XR |

LEON D. ROSDOL, *Primary Examiner.*

SUSAN E. DARDEN, *Assistant Examiner.*